United States Patent [19]
Tzannes et al.

[11] Patent Number: 5,751,716
[45] Date of Patent: May 12, 1998

[54] MULTI-CARRIER TRANSMISSION SYSTEM ADAPTED FOR PACKET DATA TRANSFER

[75] Inventors: Michael Tzannes, Newton; Marcos Tzannes, Natick, both of Mass.

[73] Assignee: Aware, Inc., Bedford, Mass.

[21] Appl. No.: 670,245

[22] Filed: Jun. 19, 1996

[51] Int. Cl.$^6$ .................................................. H04J 3/22
[52] U.S. Cl. .................................................. 370/468
[58] Field of Search .................................. 370/252, 346, 370/449, 461, 465, 480, 485, 468, 329, 341, 348, 322, 437, 431; 340/825.08, 825.52

[56] References Cited

U.S. PATENT DOCUMENTS

| | | | |
|---|---|---|---|
| 5,400,322 | 3/1995 | Hunt et al. | 375/15 |
| 5,521,906 | 5/1996 | Grube et al. | 370/252 |
| 5,555,244 | 9/1996 | Gupta et al. | 370/395 |

*Primary Examiner*—Douglas W. Olms
*Assistant Examiner*—Ajit Patel
*Attorney, Agent, or Firm*—Calvin B. Ward

[57] ABSTRACT

An improvement in a data communication link between a server site and a client site. The server site transfers data packets to the client site, each data packet causing an acknowledgment packet to be sent from the client site to the server site. Denote the ratio of the average number of bits in the data packets to the average number of bits in the acknowledgment packets by R. The communication link includes a multi-channel communication link having a plurality of data channels. Each data channel provides communication in one direction between the server site and the client site, each of the channels having a data carrying capacity characteristic of that data channel. In a communication link according to the present invention, the data channels from the server to the client site and from the client site to the server site are assigned such that the ratio of the combined data carrying capacity of the data channels from the server site to the client site to the combined data carrying capacity of the data channels from the client site to the server site is as close to R as possible given the constraint that each data channel carries data exclusively from one of the sites to the other.

2 Claims, 3 Drawing Sheets

MULTI-CARRIER TRANSMISSION SYSTEM ADAPTED FOR PACKET DATA TRANSFER

FIELD OF THE INVENTION

The present invention relates to data transmission systems, and more particularly, to systems based on multi-carrier communication systems.

BACKGROUND OF THE INVENTION

The availability of cheap computers and computer hardware has resulted in an enormous increase in the demand for data transfers between computers located at cites that are connected via communication links with limited bandwidths. For example, most of the users of the Internet are connected to the network via communication links that include a telephone line from the user's premises to a telephone company central office. Even with the increased capabilities provided by ISDN telephone service, the user is effectively limited to a data transmission rate of less than 15,000 bytes per second. Hence, a computer user requesting a large file from a server is faced with the limited bandwidth of the connection between the server and the backbone of the Internet, as well as the limited bandwidth between the user and the user's central office. It should be noted that many servers are also linked to the Internet backbone by a telephone line of limited bandwidth.

To further increase the bandwidth of the connections between the users and the telephone central office requires either replacing the current metallic conductors with fiber or increasing the effective bandwidth of the current metallic conductors. The former solution requires a substantial investment by the telephone companies, and hence, this solution is not likely to be realized in the near future.

Recently, methods for increasing the effective bandwidth of the metallic conductors have been demonstrated. In the conventional method for transmitting digital data used in ISDN, the transmission link is utilized in a digital mode and the data rate is limited by the average frequency response of the link. Because of the high degree of distortion at high frequencies, the full bandwidth of the transmission link cannot be utilized for links consisting of twisted pairs. In the recently demonstrated multi-carrier systems, the bandwidth of the link is split into a large number of sub-bands. Each sub-band is sufficiently narrow to allow the distortions in that sub-band to be specified by an attenuation coefficient and phase shift. These parameters are measured periodically by sending calibration data over the various sub-bands and measuring the distortions in that data. Each of the sub-bands is used to send data by modulating a carrier having a frequency centered in the sub-band. The amount of data that can be sent in any sub-band is limited by the noise level in that sub-band. The calibration procedures can also measure the signal to noise ratio for the various sub-bands. Hence, each of the sub-bands is used to transmit as many bits as are consistent with the measured signal-to-noise ratio and the maximum allowable bit error rate. These systems have demonstrated data transmission rates in excess of 4 million bits per second on existing telephone connections.

In a typical multi-carrier system in which frequency division multiplexing is used to separate the upstream and downstream signals, half of the sub-bands are used to transmit data from the telephone user to the central office and the remaining half of the sub-bands are used to transmit data from the central office to the telephone user. While this allocation of the link bandwidth is optimum in the absence of any information about the traffic on the communication link, it can waste almost half of the link bandwidth when the link is being used to transmit data via a packet transmission protocol such as used in Internet communications.

In general, data that is to be transmitted over a communication link having a finite error rate is broken into packets. Each packet includes added data, typically a cyclic redundancy check (CRC), to determine if the packet has been faithfully transmitted. If the recipient of the packet detects an error, the recipient requests re-transmission of the packet. Hence, each time the sender transmits a packet, it receives an acknowledgment message which indicates whether or not the sender should re-send the packet. In general, the acknowledgment message consists of a packet that is much smaller than the corresponding packet sent in the other direction. For example, in the protocol used on the Internet (TCP/IP), the acknowledgment packet is, on average, approximately one tenth the size of the corresponding data packet. Hence, the traffic in one direction is approximately 10 times that in the other direction. As a result, 80% of the capacity of the channel used to send acknowledgment packets is wasted. Hence, in the case of Internet traffic, approximately 40% of the bandwidth of the transmission link is not being utilized when the capacity of the channel is equally split between the two sites.

In prior art ADSL system, the partition between the upstream and downstream data is not equal. These systems are designed to accommodate residential applications in which video is input to the residence and a very small data stream is sent back to the central office. The data sent to the central office is primarily that needed to select the video material. The basic goal of ADSL systems is to maximize the data sent downstream while maintaining enough upstream capacity to operate.

Broadly, it is the object of the present invention to provide an improved multi-carrier transmission system.

It is a further object of the present invention to provide a multi-carrier transmission system which is better adapted to packet transfer protocols used in networking applications such as the Internet.

These and other objects of the present invention will become apparent to those skilled in the art from the following detailed description of the invention and the accompanying drawings.

SUMMARY OF THE INVENTION

The present invention is an improvement in a data communication link between a server site and a client site. The server site transfers data packets to the client site, each data packet causing an acknowledgment packet to be sent from the client site to the server site. Denote the ratio of the average number of bits in the data packets to the average number of bits in the acknowledgment packets by R. The communication link includes a multi-channel communication link having a plurality of data channels. Each data channel provides communication in one direction between the server site and the client site, each of the channels having a data carrying capacity characteristic of that data channel. In a communication link according to the present invention, the data channels from the server to the client site and from the client site to the server site are assigned such that the ratio of the combined data carrying capacity of the data channels from the server site to the client site to the combined data carrying capacity of the data channels from the client site to the server site is as close to R as possible given the constraint that each data channel carries data exclusively from one of the sites to the other.

DETAILED DESCRIPTION OF THE INVENTION

Figure 1:
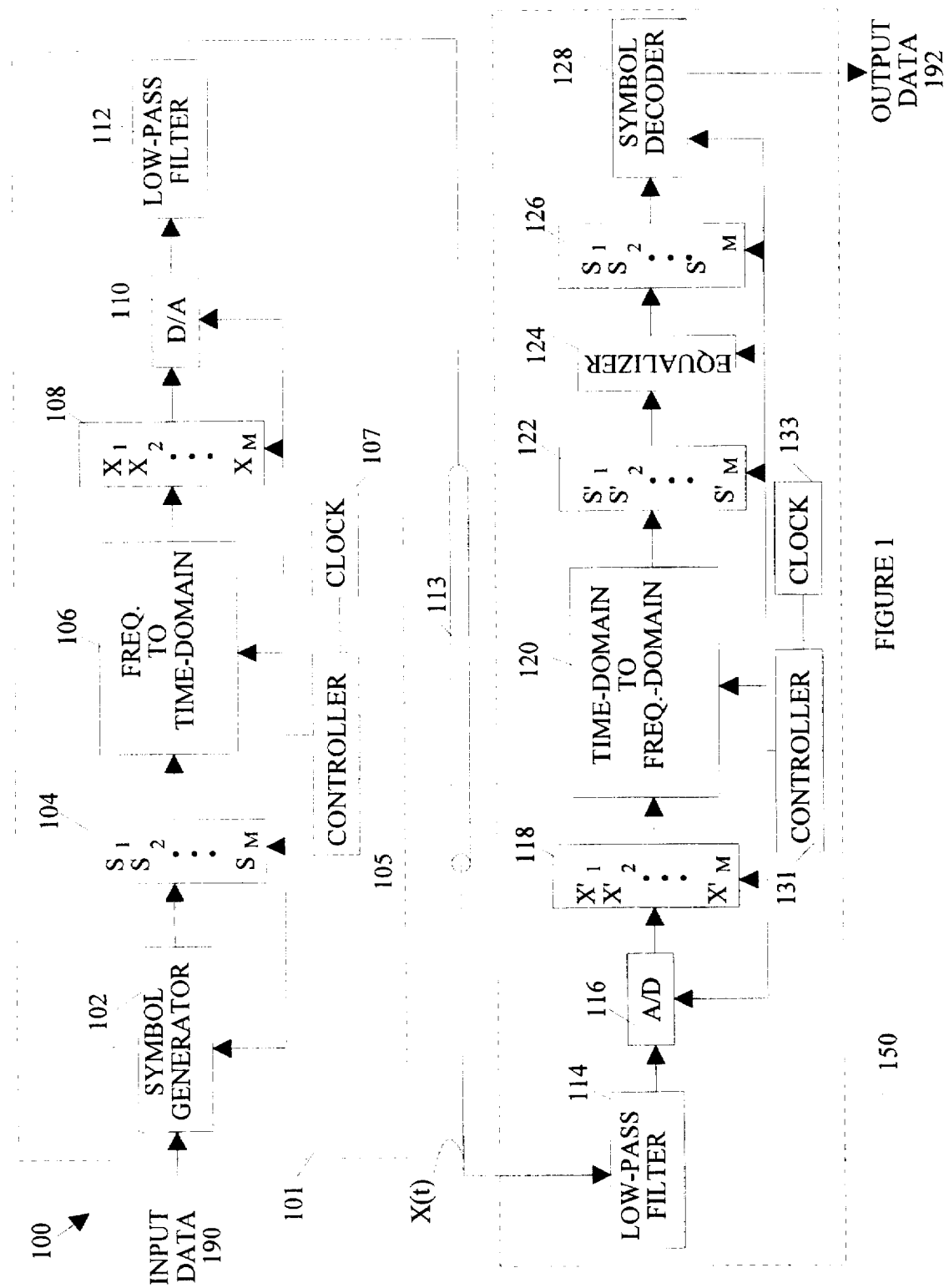
FIG. 1 is a block diagram of a typical multi-carrier transceiver which may be used to practice the present invention.

The manner in which the present invention operates can be more easily understood with reference to FIG. 1 which is a block diagram of a typical multi-carrier transceiver 100 which may be used to practice the present invention. Transceiver 100 transmits data on a communication link 113. Consider the transmission of the input data. The input data stream is received by a symbol generator 102 which converts a run of data bits from the input stream into a plurality of symbols that are to be transmitted in the next "frame". A total of M symbols $S_1, S_2, \ldots, S_M$ are stored in a register 104.

The number of possible states for each symbol will depend on the noise levels in the corresponding frequency band on the transmission channel 113 and on the error rate that can be tolerated by the data. For the purposes of the present discussion, it is sufficient to note that each symbol is a number whose absolute value may vary from 0 to some predetermined upper bound. The number of possible states for a symbol determines the amount of data that can be transmitted on the corresponding sub-band during each frame. For example, if a symbol has 16 possible values, this symbol can be used to represent 4 bits in the input data stream.

Transceiver 100 treats the symbols $S_i$ as if they were the amplitude of a signal in a narrow frequency band. As noted above, the bandwidth of each sub-band is preferably chosen such that the distortions introduced by the communication link can be modeled by an attenuation and phase shift that do not vary significantly over the transmission time of the data stream. These variables are measured during an initialization period in which known reference frames are used to evaluate the attenuation and phase shift associated with each subchannel by comparing the received frame with the original frame. These parameters may also be periodically updated by sending known signals over the communication link. The calibration procedures are well known to those skilled in the art, and hence, will not be discussed further here.

Frequency to time-domain transform circuit 106 generates a time domain signal $X_i$ for i from 0 to M-1, that has the frequency components with amplitudes $S_i$. This signal is equivalent to the sum of M sinusoidally varying oscillators in which the $i^{th}$ oscillator has a frequency centered in the $i^{th}$ sub-band and an amplitude of $S_i$. The time domain signals are stored in a shift register 108. The contents of shift register 108 represent, in digital form, the next segment of the time domain signal that is to be actually transmitted over communication link 113. The actual transmission is accomplished by clocking the digital values onto communication link 113 after converting the values to analog voltages using D/A converter 110. Clock 109 provides the timing pulses for the operation. The output of D/A converter 110 is typically low-pass filtered by filter 112 before being placed on communication link 113.

At the receiving end of transmission link 113, the transmitted segment of the time domain signal is recovered. The signals received on communication link 113 are low-pass filtered to reduce the effects of high-frequency noise transients. The signals are then digitized and shifted into a register 118. When M values have been shifted into register 118, the contents thereof are converted via a time-domain to frequency-domain transform circuit 120 to generate a set of frequency domain symbols $S'_i$. In some applications, a filter for equalization in the time domain may precede the transform circuit. This transformation is the inverse of the transformation generated by frequency to time-domain transform 106.

As noted above, communication link 113 will, in general, both attenuate and phase shift the signal represented by the $X_i$. Hence, the signal values received at low-pass filter 114 and A/D converter 116 will differ from the original signal values that were placed on transmission link 113. For this reason, the contents of shift register 118 are denoted by $X'_i$. Similarly, the output of the time to frequency-domain transform will also differ from the original symbols $S_i$; hence, the contents of register 122 are denoted by $S'_i$. Equalizer 124 corrects the $S'_i$ for the attenuation and phase shift resulting from transmission over communication link 113 to recover the original symbols which are stored in buffer 126. In addition, equalizer 124 corrects the symbols for inter-symbol interference arising from synchronization errors between the transmitter and receiver. Finally, the contents of buffer 126 are decoded to regenerate the original data streams shown at 192 by symbol decoder 128.

For the purposes of this discussion, the transformation used between the frequency and time domains will be assumed to be a Fourier-based transform such as an FFT. As noted with reference to FIG. 1, the data to be transmitted is grouped into blocks, each block containing M symbols. In some applications, the frames are separated by a guard time or use cyclic prefixes to allow for correction of synchronization errors between the sending and receiving stations. These features are known to those skilled in the art, and hence, will not be discussed in detail here. The number of possible states for each symbol depends on the signal-to-noise ratio in a corresponding frequency band on the communication link and the maximum allowable bit error rate. Time is divided into contiguous, non-overlapping equal length intervals, referred to as frames. Each frame is divided into M sub-intervals. In each time frame, one block of M symbols is transmitted. The transmission signal sent on communication link 113 shown in FIG. 1 may be viewed as conisisting of the sum of M sub-carriers with each sub-carrier being amplitude modulated by a corresponding symbol over the time period of one frame. The amplitude of the modulation signal is constant over the frame. The segment of the transmission signal corresponding to one frame is a pulse having a length equal to one frame time. The pulse for frame k is completed before the pulse for frame k+1 is sent. The shape of the pulse is a sequence of M values, one per sub-interval, obtained by applying the inverse discrete Fourier transform to the vector of M symbol values to obtain the M time-domain values. At the receiver, the M time-domain samples are input to a discrete Fourier transform to recover the M symbol values.

A noise pulse having an amplitude of dV in a sub-band will alter the corresponding symbol by an amount proportional to dV. If the alteration is less than half of the difference between the carrier amplitude corresponding to the correct symbol value and the carrier amplitude corresponding to the next allowable symbol value, the noise will not change the symbol value. The distribution of dV values is determined by the noise distribution on the communication channel. The difference between successive allowed symbol values is determined by the number of states assigned to the symbols in the channel and the transmission power. Hence, the signal-to-noise ratio and the number of symbol states determines the bit error rate on the channel. If the number of allowed symbol state increases, the difference between successive symbol states will decrease unless the power is changed. Since the power is, in general, fixed, varying the number of symbol states results in a tradeoff between bit error rate and channel throughput.

Figure 2:
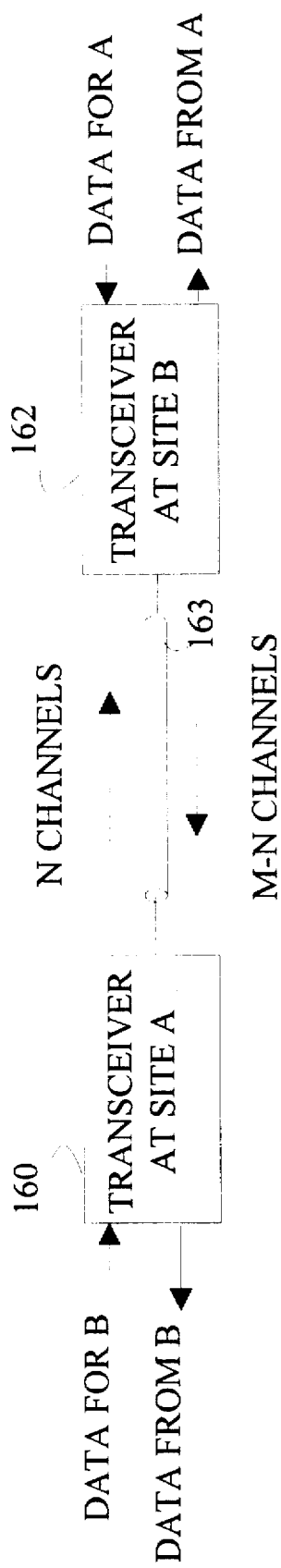
FIG. 2 is a block diagram of a two way communication system utilizing a multi-carrier communication link.

In a two way transmission system, each end has a transmitter and a receiver. Refer now to FIG. 2 which is a block diagram of a two way communication system utilizing a multi-carrier communication link 163. Each site has a transceiver which includes both a receiver and a transmitter of the type described above. In general, if communication link 163 is broken into M channels, N of those channels will be used to transmit data from site A to site B using the transmitter in transceiver 160 and the receiver in transceiver 162. The remaining M-N channels are used to send data from site B to site A using the transmitter in transceiver 162 and the receiver in transceiver 160. As noted above, N is normally chosen to be M/2. In practice, several subchannels may be reserved as guard channels between the bands that are actually used for transmission.

Consider the case in which a file is being transferred from site A to site B. The file will, in general, be broken into a plurality of packets. Each packet includes error correcting data as well as part of the file. When a packet is sent from Site A. Site A expects an acknowledgment message from Site B indicating whether or not the packet was received without error. If the acknowledgment message indicates that the packet was corrupted in transit, Site A will re-send the packet. For Internet traffic, the packet is about 10 times longer than the acknowledgment message. Hence, the traffic from Site A to Site B is about 10 times the traffic from Site B to Site A. If N=M/2, most of the capacity in the direction from B to A is wasted. Alternatively, if N=0.99M as in ADSL systems, most of the capacity in the direction from A to B is wasted because acknowledgments return too slowly over the channel links from B to A.

If the direction of data transfer is predominantly in one direction, then the value of N can be adjusted to account for this difference in traffic. Consider the case in which Site B is a server on the Internet which sends documents to users in response to requests from the users. In this case, the dominate direction of traffic flow is known, and N can be adjusted accordingly on a more or less permanent basis. If the data flow is Q times higher in the B-A direction, then, N should be chosen such that the bandwidth of the channel from B to A is Q times greater than the combined bandwidth of the channels from A to B. In this regard, it should be noted that the various channels have, in general, different data bandwidths, i.e., the channels transmit different numbers of bits per second. Hence, there is some further improvement that may be obtained by selecting the individual channels used in each direction to more accurately satisfy this constraint.

Figure 3:
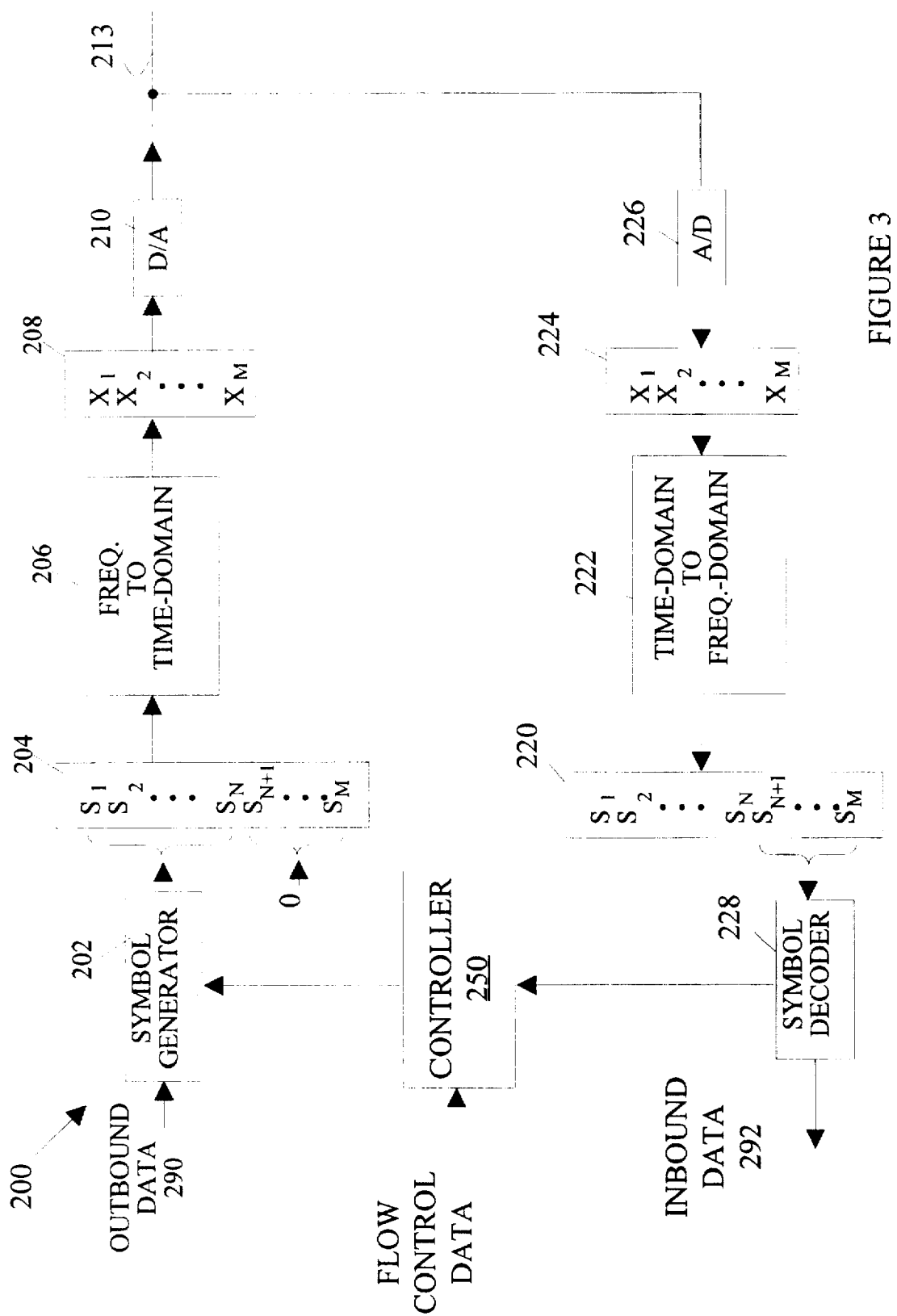
FIG. 3 is a block diagram of a transceiver 200 according to the present invention.

The manner in which the individual channels are coded by the frequency-time domain transforms may be more easily understood with reference to FIG. 3 which is a block diagram of a transceiver 200 according to the present invention. Each end of the communication link has access to all of the subchannels. The outbound data 290 is packaged into N symbols denoted by $S_1 \ldots S_N$ which are stored in register 204. The remaining N-M symbols in register 204 are set to 0. Frequency to time-domain transform circuit 206 generates M time domain samples that are stored in register 208 and shifted onto communication link 213 after being converted to analog values by D/A converter 210. To simplify the drawing, any additional signal conversion such as an up conversion to a radio frequency band has been omitted from the drawing; however, it is to be understood that any such conversion is contained in D/A converter 210. The figure shows the N sub-channels organized into two contiguous blocks, one for transmissions from A to B and one for transmissions from B to A. However, embodiments in which the sub-channels used for each direction are interleaved are also possible.

A similar transmitter is operating at the other end of communication link 213 in which the symbols are stored in locations $S_N \ldots S_M$ with locations $S_1 \ldots S_N$ set to 0. These values are being added to communication link 213 at the other end of the link. Hence, A/D converter 226 measures a signal at any time that is the sum of the signals generated by the two time domain samples being shifted onto communication link 213 from each end of communication link 213. These signals are shifted into a register 224. When the register has accumulated M samples, time-domain to frequency-domain circuit 222 recovers M symbols. Since the signals at each end use different frequency bands, the two signals are resolved by circuit 222 into the N-M symbols sent by the transmitter at the other end of communication link 213 and the symbols sent by circuit 210 from some previous frame. The later symbol set is ignored by symbol decoder 228 which recovers the inbound data 292 from symbols $S_{N+1} \ldots S_M$. To simplify the drawing, the various equalization operations discussed above with reference to FIG. 1 have been omitted from the drawing.

As noted above, the value of N may be set more or less permanently if there is a clearly preferred direction of file transfer. However, such a system is, at best, an approximation, since even servers receive files from users. If nothing else, the user's "order" for a file stored on the server is a file that is transferred in the same manner. Hence, in another embodiment of the present invention, the direction of file transfer is communicated to controller 250 and its counterpart at the other end of communication link 213. The controllers then allocate the bands such that the transmitter in the transceiver associated with the file "sender" has Q times more bandwidth than the transmitter sending acknowledgment packets back to the sender.

To provide this switching capability, two or more of the channels are dedicated for transmissions between the controller. As noted above, the various channels in the multi-carrier system have different capacities. In general, channels at the higher end of the frequency spectrum will have lower effective bandwidth since the attenuation in these high frequency channels tends to be greater than that in the low frequency channels. Since the controllers have the smallest bandwidth requirements, two of these low capacity high frequency channels are typically assigned for the controller communications.

The above embodiments of the present invention have been described in terms of a multi-carrier transmission link. However, it will be apparent to those skilled in the art that the teachings of the present invention can be applied to other multi-channel communication links connecting a server site to a client site. The present invention will provide advantages when the communication link includes a multi-channel communication link having a plurality of data channels in which, each data channel provides communication in one direction between sites. Each channel has a data carrying capacity characteristic of that data channel. In a communication link according to the present invention, each data channel is assigned either to the server or the client for transmission of packets. The assignment is made such that the ratio of the combined data carrying capacity of the data channels from the server site to the client site to the combined data carrying, capacity of the data channels from the client site to the server site is as close to R as possible given the constraint that each data channel carries data exclusively from one of said sites to the other. Here, R is the ratio of the number of bits in the average data packet to the number of bits in the average acknowledgment packet.

Various modifications to the present invention will become apparent to those skilled in the art from the foregoing description and accompanying drawings. Accordingly, the present invention is to be limited solely by the scope of the following claims.

What is claimed is:

1. In a data communication link between a server site and a client site, said server site transferring data packets to said client site, each data packet causing an acknowledgment packet to be sent from said client site to said server site, the ratio of the average number of bits in said data packets to the average number of bits in said acknowledgment packets being where R is greater than 1, wherein said communication link comprises a multi-channel communication link having a plurality of data channels, each said data channel providing communication in one direction between said server site and said client site, each channel having a data carrying capacity characteristic of that data channel, the improvement comprising assigning data channels from said server to said client site and from said client site to said server site such that the ratio of the combined data carrying capacity of said data channels from said server site to said client site to the combined data carrying capacity of said data channels from said client site to said server site is as close to R as possible given the constraint that each data channel carries data exclusively from one of said sites to the other in only one direction.

2. The data communication link of claim 1 wherein one of said data channels in each direction is reserved for communication between sites, and wherein said channels assignments are altered in response to changes in the data packets sent between said client and server sites by communicating said data channel assignments on said reserved channels.

\* \* \* \* \*